(12) United States Patent
Fukui et al.

(10) Patent No.: US 8,338,022 B2
(45) Date of Patent: *Dec. 25, 2012

(54) LITHIUM SECONDARY BATTERY AND METHOD FOR MANUFACTURING THE SAME

(75) Inventors: Atsushi Fukui, Tokushima (JP); Hiroshi Minami, Tokushima (JP); Shoichiro Sawa, Tokushima (JP); Mariko Torimae, Kobe (JP); Yasuyuki Kusumoto, Kobe (JP); Maruo Kamino, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 66 days.

This patent is subject to a terminal disclaimer.

(21) Appl. No.: 11/001,192

(22) Filed: Dec. 2, 2004

(65) Prior Publication Data

US 2005/0123829 A1     Jun. 9, 2005

(30) Foreign Application Priority Data

Dec. 4, 2003   (JP) ................................. 2003-405748

(51) Int. Cl.
*H01M 2/02* (2006.01)

(52) U.S. Cl. ......... 429/164; 429/163; 429/142; 429/144

(58) Field of Classification Search .................. 29/623.1
See application file for complete search history.

(56) References Cited

U.S. PATENT DOCUMENTS

| | | | | |
|---|---|---|---|---|
| 5,912,089 A | * | 6/1999 | Kitano et al. | 429/53 |
| 5,925,482 A | * | 7/1999 | Yamashita | 429/130 |
| 6,420,066 B1 | * | 7/2002 | Frustaci et al. | 429/94 |
| 6,485,865 B1 | * | 11/2002 | Sugikawa | 429/235 |
| 6,805,994 B1 | * | 10/2004 | Shibamoto | 429/94 |
| 7,132,194 B2 | * | 11/2006 | Mizutani | 429/94 |
| 7,220,518 B2 | * | 5/2007 | Omaru et al. | 429/314 |
| 2004/0043294 A1 | * | 3/2004 | Fukui et al. | 429/235 |

FOREIGN PATENT DOCUMENTS

| | | |
|---|---|---|
| JP | 05-234620 A | 9/1996 |
| JP | 10-092428 A | 4/1998 |
| JP | 11-111327 A | 4/1999 |
| JP | 11-354127 A | 12/1999 |
| JP | 2000-012088 | * 1/2000 |
| JP | 2000-021452 A | 1/2000 |
| JP | 2002-260637 A | 9/2002 |
| WO | WO 03/017411 | * 2/2003 |

OTHER PUBLICATIONS

Machine translation of JP 05-234620.*

* cited by examiner

*Primary Examiner* — Cynthia Lee

(74) *Attorney, Agent, or Firm* — McDermott Will & Emery LLP

(57) ABSTRACT

A lithium secondary battery of the present invention comprises a positive electrode formed by disposing a positive-electrode mixture layer containing a positive-electrode active material and a positive-electrode binder, on a surface of a positive-electrode current collector; a negative electrode formed by sintering a negative-electrode mixture layer containing a negative-electrode binder and a negative-electrode active material containing silicon and/or a silicon alloy, disposed on a surface of a negative-electrode current collector; a separator disposed between the positive electrode and the negative electrode; and a nonaqueous electrolyte; wherein an electrode unit obtained by setting the positive electrode and the negative electrode opposed to each other through the separator and rolling them in spirally rolled state is placed in a cylindrical battery container and wherein a curvature radius of the negative-electrode mixture layer opposed to the positive-electrode mixture layer through the separator in the spirally rolled state is 1.5 mm or larger.

14 Claims, 4 Drawing Sheets

F I G. 3
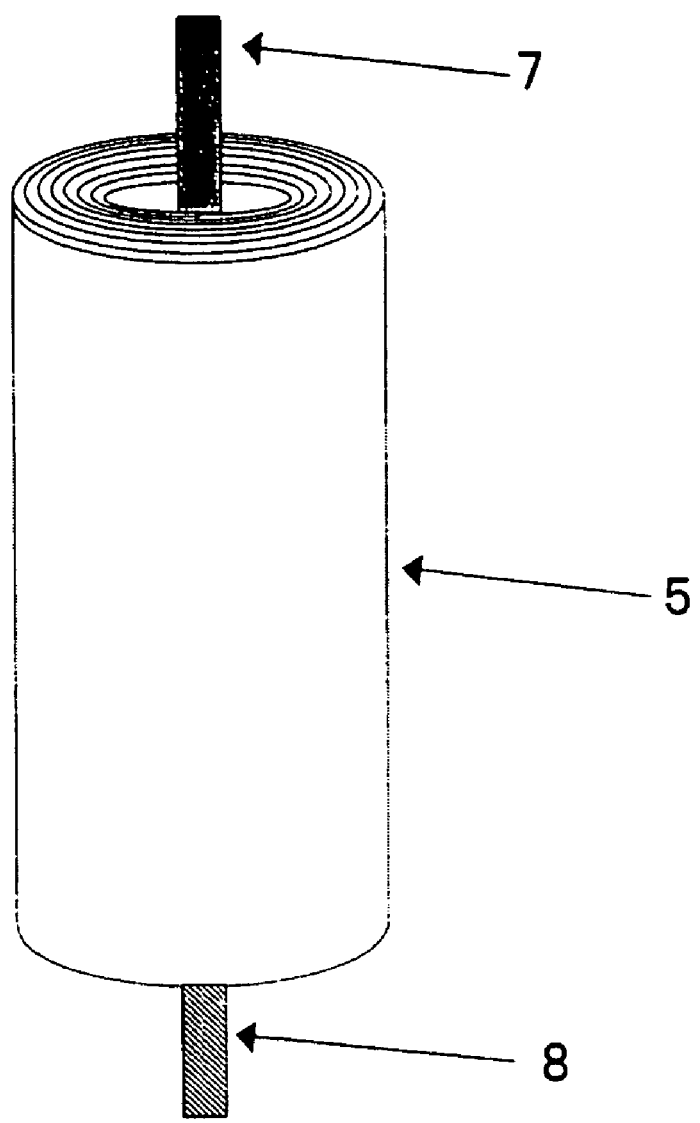

LITHIUM SECONDARY BATTERY AND METHOD FOR MANUFACTURING THE SAME

BACKGROUND OF THE PRESENT INVENTION

1. Field of the Present Invention

The present invention relates to a lithium secondary battery and method for manufacturing the same.

2. Description of the Related Art

In recent years, as one of innovative secondary batteries with a high power and a high energy density, a lithium secondary battery using a nonaqueous electrolyte and chargeable by moving lithium ion between a positive electrode and a negative electrode has been utilized.

Due to its high energy density, lithium secondary batteries have been used practically and become popular as power sources for electronic portable appliances of information technology such as note-type personal computers and mobile phones. In future, owing to further compactness and higher functionality required for these portable appliances, it is expected to increase the load on the lithium secondary batteries as power sources. Therefore, the requirement of high energy density for the lithium secondary batteries has been increased very high.

To increase the energy density of a battery, use of a material having higher energy density as an active material is effective means. Accordingly, recently, in the lithium secondary batteries, alloy materials of elements such as Al, Sn, and Si storing lithium by alloying with lithium have been proposed and investigated as negative-electrode active material having high energy density in place of graphite which is presently used practically.

However, in the electrodes for which such materials alloying with lithium are used as active material, since the volume of the active material is expanded/shrunk at the time of storage (intercalate) /release (deintercalate) of lithium, there occurs a problem that the active material is pulverized and separated from current collectors to result in current collection deterioration in the electrodes and charge-discharge cycle property deterioration.

The applicant of the present invention has found that with respect to an electrode using a silicon-containing material as a negative-electrode active material to be alloyed with lithium, a negative electrode formed by sintering a mixture layer containing active material of the silicon-containing material and a binder on the surface of a current collector of a surface-roughened conductive metal foil in a non-oxidizing atmosphere exhibits high current collection capability in the electrode owing to the high adhesion property of the mixture layer and the current collector and thus provides good charge-discharge cycle property (Japanese Patent Application Laid-Open No. 2002-260637).

However, in the case of using the above-mentioned negative electrode, investigations in details on what battery structure is excellent in the charge-discharge cycle property have not been made yet.

SUMMARY OF THE PRESENT INVENTION

The purpose of the present invention is to provide a lithium secondary battery excellent in the charge-discharge cycle property and having a high energy density and its manufacturing method, concerning a lithium secondary battery comprising a negative electrode formed by sintering a mixture layer containing active material particles of silicon and/or a silicon alloy and a binder, on the surface of a current collector of a conductive metal foil.

A lithium secondary battery of the present invention comprises a positive electrode formed by disposing a positive-electrode mixture layer containing a positive-electrode active material and a positive-electrode binder, on a surface of a positive-electrode current collector; a negative electrode formed by sintering a negative-electrode mixture layer containing a negative-electrode binder and a negative-electrode active material containing silicon and/or a silicon alloy, disposed on a surface of a negative-electrode current collector; a separator disposed between the positive electrode and the negative electrode; and a nonaqueous electrolyte; and is characterized in that an electrode unit obtained by setting the positive electrode and the negative electrode opposed to each other through the separator and rolling them in spirally rolled state is placed in a cylindrical battery container and wherein a curvature radius of the negative-electrode mixture layer opposed to the positive-electrode mixture layer through the separator in the spirally rolled state is 1.5 mm or larger.

In the present invention, the positive electrode and the negative electrode are opposed to each other through the separator and rolled in the spirally rolled state so as to adjust the curvature radius of the negative-electrode mixture layer to be 1.5 mm or larger. Since the curvature radius of the negative-electrode mixture layer is minimum in the innermost circumferential part, the curvature radius of the entire negative-electrode mixture layer can be adjusted to be 1.5 mm or larger. Adjusting the curvature radius of the negative-electrode mixture layer to be 1.5 mm or larger can suppress uneven strain generation. Therefore, it is made possible to relax the stress generated by the large volume change of the negative-electrode active material at time of storage and release of lithium in the mixture layer and the current collector. Thus the current collection property in the electrodes can be maintained upon repeating charge and discharge to provide an excellent charge-discharge cycle property.

In the present invention, the curvature radius of the negative-electrode mixture layer means the curvature radius of the center part of the negative-electrode mixture layer in the thickness direction. In the case the negative-electrode mixture layer on the opposite to the positive-electrode mixture layer has a portion where the curvature radius is smaller than 1.5 mm, the stress moderation in the mixture layer cannot properly be carried out at the time of charge-discharge cycles in the portion where the curvature radius is smaller than 1.5 mm and the mixture layer is broken. Therefore, breakage is induced even in the portion having 1.5 mm or larger curvature radius continued from the portion having the curvature radius of smaller than 1.5 mm in the negative-electrode mixture layer. That is, if the negative-electrode mixture layer includes the portion with a curvature radius of smaller than 1.5 mm, the current collection property is deteriorated even in other portions and therefore the charge-discharge cycle property is significantly deteriorated.

On the other hand, if the negative-electrode mixture layer is provided only on one face of a negative-electrode current collector in a portion of the negative-electrode mixture layer where the curvature radius is 2.5 mm or smaller, the negative electrode is preferable to be rolled in spirally rolled state so as to place the negative-electrode current collector in the inside and the negative-electrode mixture layer in the outside. The reason for that is supposed as follows.

In the case the rolling is done so as to place the negative-electrode mixture layer in the inside and the negative-electrode current collector in the outside, the stress is caused in the negative-electrode mixture layer in the contractive direction, since the negative-electrode mixture layer is positioned in the inner side in relation to the negative-electrode current collector. At the time of storing lithium, the mixture layer is strained in the expansive direction by the volume expansion of the active material so that the stress caused by the strain is concentrated in the mixture layer to make the mixture layer easy to be broken. On the contrary, if rolling is done so as to place the negative-electrode current collector in the inside and the negative-electrode mixture layer in the outside, the stress is caused in the mixture layer in the expansion direction, since the negative-electrode mixture layer is positioned in the outer side in relation to the negative-electrode current collector. In such a case, the stress caused by the increase of the volume of the mixture layer resulting from the volume expansion of the active material at the time of lithium storage is easily moderated. Therefore, an excellent charge-discharge cycle property can be obtained.

As described above, in the portion of the negative-electrode mixture layer having a curvature radius of 2.5 mm or smaller, it is preferable to place the negative-electrode mixture layer only on one face of the negative-electrode current collector and to carry out rolling in spirally rolling state in such a manner that the negative-electrode current collector is positioned in the inner side and the negative-electrode mixture layer in the outside. Also, in such a portion, the separator, the positive-electrode mixture layer, and the positive-electrode current collector are rolled on the outside of the negative-electrode mixture layer in this positing order in spirally rolled state.

A manufacturing method of the present invention is a method for manufacturing the above-mentioned lithium secondary battery of the present invention and involves the steps of producing an electrode unit by setting a positive electrode and a negative electrode on the opposite to each other via a separator and rolling them in spirally rolled state in such a manner that the curvature radius of the negative-electrode active material layer is adjusted to be 1.5 mm or larger and housing the electrode unit in a cylindrical battery container.

According to the manufacturing method of the present invention, because of the above-mentioned reasons, the lithium secondary battery excellent in the charge-discharge cycle property can be produced.

Also, in the manufacturing method of the present invention it is preferable to form the negative-electrode mixture layer on only one face of the negative-electrode current collector and carry out rolling in spirally rolling state in such a manner that the negative-electrode current collector is positioned in the inner side and the negative-electrode mixture layer in the outside in the portion of the negative-electrode mixture layer where the curvature radius is 2.5 mm or smaller.

Further, in the present invention, it is preferable to carry out sintering of the negative electrode in nonoxidizing atmosphere.

In the present invention, the negative-electrode mixture layer is formed on the surface of the negative-electrode current collector by applying a slurry obtained by dispersing negative-electrode active material particles in a binder solution to the surface of the negative-electrode current collector.

In the manufacturing method of the present invention, after the mixture layer is formed on the surface of the negative-electrode current collector and before the sintering, the negative-electrode mixture layer is preferably rolled together with the negative-electrode current collector. The rolling in such a manner increases the filling density in the negative-electrode mixture layer and heightens the adhesion strength among the active material particles and between the mixture layer and the current collector. Therefore, good charge-discharge cycle property can be achieved.

Sintering in the nonoxidizing atmosphere in the present invention can be carried out in vacuum, nitrogen atmosphere, or atmosphere of inert gas such as argon. Also, it may be carried out in reducing atmosphere such as hydrogen atmosphere. The thermal treatment temperature at the time of sintering is preferably a temperature equal to or lower than the melting point of the metal foil current collector and the active material particles. For example, in the case of using a copper foil as the metal foil current collector, it is preferably 1083° C., which is the melting point of copper, or lower, further preferably in a range of 200 to 500° C., and further preferably in a range of 300 to 450° C. The sintering method may be carried out by using a spark plasma sintering method and a hot press method.

Hereinafter, the negative electrode, the positive electrode, and the nonaqueous electrolyte in the lithium secondary battery of the present invention will be described.

<Negative Electrode>

As the negative-electrode active material to be used for the present invention, silicon and/or silicon alloy particles can be exemplified. As the silicon alloy, solid solution of silicon and one or more other elements, intermetallic compounds of silicon and one or more other elements, and eutectic alloy of silicon and one or more other elements can be exemplified. As the alloy manufacturing method, an arc melting method, a liquid quenching method, a mechanical alloying method, a sputtering method, a chemical vapor phase deposition method, and a sintering method can be exemplified. Particularly, as a liquid quenching method, a single roll quenching method, a double roll quenching method, and various atomization methods such as a gas atomization method, a water atomization method, and a disk atomization method can be exemplified.

As the negative-electrode active material particles to be used for the present invention, those obtained by coating the surfaces of silicon and/or silicon alloy particles with metals and the like may be used. As a coating method, an electroless plating method, an electric plating method, a chemical reduction method, an evaporation method, a sputtering method, and a chemical vapor phase deposition method can be exemplified. As a metal for coating the particle surfaces, the metal same as the metal foil to be used as the current collector is preferable. Use of the metal same as the metal foil makes it possible to improve the bonding property to the current collector at the time of sintering and to obtain a further improved charge-discharge cycle property.

The negative-electrode active material particles to be used in the present invention may contain particles of a material to be alloyed with lithium. As a material to be alloyed with lithium, germanium, tin, lead, zinc, magnesium, sodium, aluminum, gallium, indium, and their alloys can be exemplified.

The average particle diameter of the negative-electrode active material particles to be used in the present invention is not particularly limited, however to carry out sintering effectively, it is preferably 100 μm or smaller, more preferably 50 μm or smaller, and even more preferably 10 μm or smaller. The smaller the particle diameter of the active material particles is, the better the cycle properties tend to be. Also, the average particle diameter of conductive particles added to the mixture layer is not limited particularly, however it is preferably 100 μm or smaller, more preferably 50 μm or smaller, and even more preferably 10 μm or smaller.

Owing to use of active material particles with a small average particle diameter, the absolute degree of the expansion and contraction of the volume of the active material particles following the storage and release of lithium in the charging-discharging reaction is lowered and therefore the absolute degree of the strain among the active material particle in the electrodes at the time of the charging-discharging reaction is suppressed to result in prevention of binder breakage, suppression of the deterioration of current collecting capability in the electrodes, and the good charge-discharge cycle property.

Further, the particle size distribution of the active material particles is preferable to be as narrow as possible. If the particle size distribution is broad, since difference of the absolute degrees of expansion and contraction of the volume following the storage and release of lithium among the active material particles with a broad size distribution becomes high, the strain is caused in the mixture layer and binder breakage is caused. Therefore, the current collection capability in the electrodes is deteriorated and the charge-discharge cycle property is deteriorated.

The negative-electrode current collector in the present invention is preferable to have the surface with an arithmetical mean roughness Ra 0.2 μm or higher. Use of the current collector having the surface with an arithmetical mean roughness Ra as described increases the contact surface of the mixture layer and the current collector and thus improve the adhesion strength of the mixture layer and the current collector. Accordingly, the current collection capability in the electrodes can be improved further. In the case the mixture layer is formed in both faces of the current collector, the arithmetical mean roughness Ra is preferably 0.2 μm or higher in both faces of the current collector.

The arithmetical mean roughness Ra is defined by JIS B 0601-1994. The arithmetical mean roughness Ra can be measured by, for example, a surface roughness meter.

The above-mentioned arithmetical mean roughness Ra and the mean spacing of local peaks of profile S are preferable to have a relation: 100 Ra≧S. The mean spacing of local peaks of profile S is defined by JIS B 0601-1994 and can be measured by, for example, a surface roughness meter.

In the present invention, the thickness of the negative-electrode current collector is not part particularly limited, however it is preferably in a range of 10 to 100 μm.

In the present invention, the upper limit of the arithmetical mean roughness Ra of the negative-electrode current collector surface is not particularly limited, however since the thickness of the current collector is preferably in a range of 10 to 100 μm, the upper limit of the arithmetical mean roughness Ra of the current collector surface is preferably 10 μm or less practically.

The negative-electrode current collector in the present invention is made of a conductive metal foil. As a conductive metal foil, foils of metals such as copper, nickel, iron, titanium, cobalt and alloys of these metals in combination can be exemplified. Particularly, those containing metal elements easy to be diffused in the active material are preferable. As such materials, metal foils containing copper element, more specifically a copper foil or a copper alloy foil, can be exemplified. Since it is easy to be diffused in the silicon material, which is an active material, by heating, copper is expected to improve the adhesion strength of the current collector and the active material by sintering. In the case of aiming the improvement of the adhesion strength of the current collector and the active material by sintering, it is desirable to use a metal foil having a layer containing copper element on the surface of current collector to be bought into contact with the active material as the current collector. Accordingly, in the case of using a metal foil of a metal element other than copper, it is preferable to form a copper or copper alloy layer on the surface.

As the copper alloy foil, a heat resistant copper alloy foil is preferable to be used. The heat resistant copper alloy means a copper alloy having a tensile strength of 300 MPa or higher after annealing at 200° C. for 1 hour.

As described briefly, the negative-electrode current collector to be used in the present invention is preferable to have a significant roughened surface. Therefore, if the arithmetical mean roughness Ra of the surface of the heat resistant copper alloy foil is not sufficiently high, electrolytic copper or electrolytic copper alloy may be formed on the foil surface so as to significantly roughen the surface. The electrolytic copper layer or the electrolytic copper alloy layer may be formed by an electrolytic method.

In the present invention, to make the surface of the negative-electrode current collector significantly uneven, the surface roughening treatment may be carried out. As such a surface roughening treatment, a vapor phase deposition method, an etching method, and a polishing method can be exemplified. As the vapor phase deposition method, a sputtering method, a CVD method, and an evaporation method can be exemplified. As the etching method, a physical etching and chemical etching method can be exemplified. As the polishing method, polishing with sand paper and polishing by blast method can be exemplified.

In the present invention, the thickness X of the negative-electrode mixture layer is preferable to satisfy the relation with the thickness Y of the negative-electrode current collector and the arithmetical mean roughness Ra of the surface as 5 Y≧X and 250 Ra≧X. If the mixture layer thickness X exceeds 5 Y or 250 Ra, the mixture layer is sometimes separated from the current collector.

The thickness X of the negative-electrode mixture layer is not particularly limited, however it is preferably 1,000 μm or smaller, and more preferably in a range of 10 μm to 100 μm.

In the present invention, the negative-electrode mixture layer may contain a conductive powder. Addition of the conductive powder forms conductive network around the active material particles by the conductive powder, so that the current collection capability in the electrodes can be improved further. As the conductive powder, the materials same as those for the above-mentioned current collector can preferably be used. Practically, copper, nickel, iron, titanium, cobalt and alloys and mixtures of these metals in combination can be exemplified. Particularly, a copper powder is preferably used as the metal powder. Also, a conductive carbon powder is preferably used.

The addition amount of the conductive powder to the negative-electrode mixture layer is preferably 50% by weight or less in the total weight of the active material particles and the conductive powder. If the addition amount of the conductive powder is too much, the mixing ratio of the active material particles is relatively decreased, so that the charge-discharging capacity of the electrodes is decreased.

The negative-electrode binder to be used in the present invention is preferable to remain without being decomposed completely even after heating treatment for sintering. If the binder remains without being decomposed completely even after heating treatment, the adhesion strength between the active material particles and the current collector by sintering and among the active material particles is improved and also the binding force of the binder is added to further heighten the adhesion property. Further, in the case the metal foil with arithmetical mean roughness Ra 0.2 μm or higher is used as the current collector, the binder enters in the roughened surface parts of the current collector, so that an anchor effect is caused between the binder and the current collector to result in further improvement of the adhesion property. Accordingly, the separation of the active material layer from the current collector by expansion and contraction of the volume of the active material at the time of storing and releasing lithium can be suppressed and good charge-discharge cycle property can be obtained.

As the negative-electrode binder in the present invention, a polyimide is preferably used. As the polyimide, thermoplastic polyimides and thermosetting polyimides can be exemplified. Particularly thermoplastic polyimides are used preferably as the polyimide. In the case of using thermoplastic polyimides having a glass transition temperature as the negative-electrode binder, since the binder is thermally fused with the active material particles and the current collector by heating the negative electrode at a temperature higher than the glass transition temperature, the adhesion strength is remarkably improved and the current collection capability in the electrodes is greatly improved. That is, if the temperature of the heating for sintering the negative-electrode mixture layer and the negative-electrode current collector of the conductive metal foil is higher than the glass transition temperature of the negative-electrode binder, the effect to improve the close adhesion property by the thermal fusion of the binder can be obtained in addition to the effect to improve the close adhesion property by the sintering and thus the current collection capability in the electrodes can be greatly improved.

The polyimide may be obtained by heating a polyamide acid. The polyimide obtained by heating the polyamide acid is a polyimide derived from a polyamide acid by dehydration condensation by the heating treatment. The imidation ratio of the polyimide is preferably 80% or higher. The imidation ratio means the mole % of the produced polyimide to the polyimide precursor (the polyamide acid). Those with the imidation ratio 80% or higher can be obtained by heating an N-methyl-2-pyrrolidone (NMP) solution containing a polyamide acid at 100 to 400° C. for 1 hour or longer. For example, in the case of heating at 350° C., the imidation ratio reaches 80% by heating for about 1 hour and the imidation ratio reaches 100% by heating for about 3 hours.

In the present invention, since it is preferable for the binder to remain without being decomposed completely even after the heating for sintering, in the case the polyimide is used as the binder, it is preferable to carry out sintering treatment at 600° C. at which the polyimide is not decomposed completely.

In the present invention, the amount of the binder in the negative-electrode mixture layer is preferably 5% by weight or higher in the total weight of the mixture layer. The volume of the binder is preferably 5% or more in the total volume of the mixture layer. If the amount of the binder in the mixture layer is too small, the adhesion strength in the electrodes by the binder becomes insufficient in some cases. If the amount of the binder in the mixture layer is too much, the resistance in the electrodes increases to make initial charging difficult in some cases. Accordingly, the binder amount in the mixture layer is preferably 50% or less by weight in the total weight and the volume of the binder is preferably 50% or less in the total volume of the mixture layer.

<Positive Electrode>

As the positive-electrode active material to be used in the present invention, lithium-containing transition metal oxides such as $LiCoO_2$, $LiNiO_2$, $LiMn_2O_4$, $LiMnO_2$, $LiCo_{0.5}Ni_{0.5}O_2$, and $LiNi_{0.7}Co_{0.2}Mn_{0.1}O_2$ and lithium-free metal oxides such as $MnO_2$ can be exemplified. Further, besides them, substances which can electrochemically intercalate and release lithium can be used without any particular limit.

As the positive-electrode binder to be used in the present invention, those which can be used as a binder for electrodes of lithium secondary batteries can be used without any particular limit. For example, fluoro resins such as poly vinylidene fluoride and polyimide resins to be used preferably for the negative-electrode binder can be used.

<Nonaqueous Electrolyte>

The solvent for a nonaqueous electrolyte to be used for the lithium secondary battery of the present invention is not particularly limited and cyclic carbonates such as ethylene carbonate, propylene carbonate, butylene carbonate, and vinylene carbonate and chain carbonates such as dimethyl carbonate, methyl ethyl carbonate, and diethyl carbonate can be exemplified. In the case the cyclic carbonate exists in the solvent of the nonaqueous electrolyte, a desirable coating film excellent in the lithium ion conductivity is easily formed on the surface of the active material particles and therefore, the cyclic carbonate is preferably used. Particularly, ethylene carbonate is used preferably. Also, a solvent mixture of a cyclic carbonate and a chain carbonate can preferably be used. As such a solvent mixture, ethylene carbonate and diethylene carbonate are preferably contained. Solvent mixtures of the above-mentioned cyclic carbonate with an ether type solvent such as 1,2-dimethoxyethane ad 1,2-diethoxyethane and a chain ester such as γ-butyrolactone, sulfolane, and methyl acetate can also be exemplified.

As the solute of the nonaqueous electrolyte, $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and their mixtures can be exemplified. Particularly, solute mixtures of $LiXF_y$ (wherein X is P, As, Sb, B, Bi, Al, Ga, or In and in the case X is P, As, or Sb, y is 6 and X is B, Bi, Al, Ga, or In, y is 4) with lithium perfluoroalkylsulfonic acid imides $LiN(C_mF_{2m+1}SO_2)(C_nF_{2n+1}SO_2)$ (wherein m and n are independently an integer of 1 to 4) or lithium perfluoroalkylsulfonic acid methides $LiC(C_pF_{2p+1}SO_2)(C_qF_{2q+1}SO_2)(C_rF_{2r+1}SO_2)$ (wherein p, q, and r are independently an integer of 1 to 4) are preferably used. Among them, a mixed solute of $LiPF_6$ and $LiN(C_2F_5SO_2)_2$ is particularly preferable to be used.

Further, as the electrolyte, a gel type polymer electrolyte obtained by impregnating a polymer electrolyte of polyethylene oxide or polyacrylonitrile with an electrolytic solution and an inorganic solid electrolyte such as LiI and $Li_3N$ can be exemplified. The electrolyte of the lithium secondary battery of the present invention may be used without any particular limit if the lithium compound as a solute for providing ion conductivity and the solvent dissolving and keeping the compound are not decomposed by the voltage at the time of charging, discharging, or storage.

The separator to be used in the lithium secondary battery of the present invention is not particularly limited and those which can use for the separator of the lithium secondary battery can be used without any particular limit. For example, finely porous membranes made of polyethylene or polypropylene can be used.

According to the present invention, a lithium secondary battery excellent in charge-discharge cycle property and having a high energy density is obtained if the lithium secondary battery comprises the negative electrode formed on the surface of the current collector by sintering the mixture layer containing active material particles containing silicon and/or silicon alloy and the binder.

BRIEF DESCRIPTION OF THE DRAWINGS

FIG. 3 is a perspective view showing an electrode unit of an example of the present invention.

DESCRIPTION OF THE PREFERRED EXAMPLES

Figure 1:
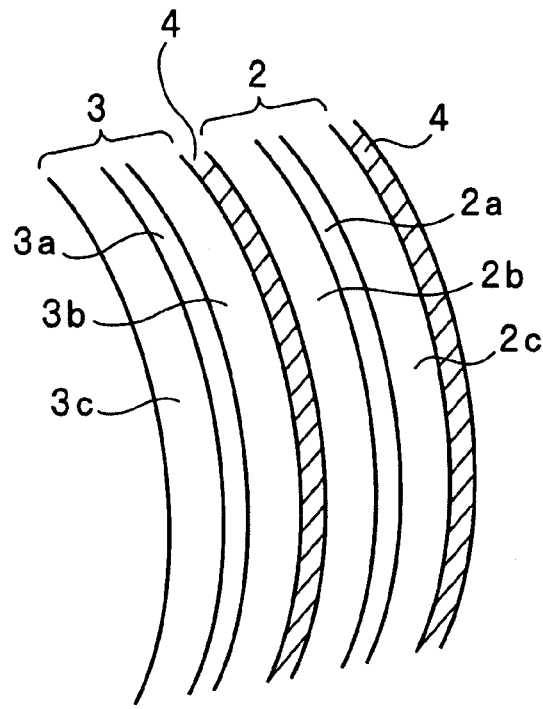
FIG. 1 is a cross-sectional view showing the layered state of a negative electrode, a separator, and a positive electrode of an example of the present invention.

Hereinafter, the present invention will be described more in details along with preferred examples, however it is not intended that the present invention be limited to these illustrated examples. Modifications and substitutions to specific process conditions and structures can be made without departing from the spirit and scope of the present invention. Accordingly, the present invention is not to be considered as being limited by the following examples, but is only limited by the scope of the appended claims.

EXPERIMENT 1

[Production of Negative Electrode]

As an active material, 81.8 parts by weight of silicon powder (purity 99.9%) with an average particle diameter of 3 μm was dissolved in 8.6% by weight of N-methyl-2-pyrrolidone solution containing 18.2 parts by weight of thermoplastic polyimide with a glass transition temperature of 190° C. as a binder to obtain a negative-electrode mixture slurry.

As a current collector, a 35 μm-thick Cu-0.03 wt. % Zr alloy foil roughened by electrolytic copper plating in both faces to have an arithmetical mean roughness Ra 1.0 μm was used. The above-mentioned negative-electrode mixture slurry was applied to both faces of the current collector and dried. The obtained alloy foil was cut in to rectangular shape of 180 mm×32 mm and rolled and then heated at 400° C. for 30 hours in argon atmosphere for sintering to obtain a negative electrode.

The thickness of the negative electrode (including the current collector) was 65 μm. Accordingly the thickness of the mixture layer formed on one face of the current collector was 15 μm. The ratio of the thickness of the current collector/the arithmetical mean deviation Ra of the mixture layer was 30 and the ratio of the thickness of the mixture layer/the thickness of the current collector was 0.43.

In this negative electrode, the density of the polyimide was 1.1 g/cm$^3$ and the volume of the polyimide in the total volume of the mixture layer was 31.8%.

[Production of Positive Electrode]

As starting materials, $Li_2CO_3$ and $CoCO_3$ were weighed so as to adjust the atomic ratio of Li: Co to be 1:1 and mixed each other in a mortar and pressed by a die with a diameter of 17 mm for pressure forming and then fired at 800° C. for 24 hours in air to obtain a $LiCoO_2$ sintered body which was crushed in a mortar to adjust the average particle diameter 20 μm.

94 parts by weight of the obtained $LiCoO_2$ powder and 3 part by weight of the synthetic graphite powder as a conductive agent were mixed with a 6 wt. % of N-methyl-2-pyrrolidone solution containing 3 parts by weight of poly (vinylidene fluoride) as a binder to obtain a positive-electrode mixture slurry.

The positive-electrode mixture slurry was applied to both faces of an aluminum foil (thickness 15 μm) as a current collector and dried, and after that the resulting foil was rolled. The thickness of the electrode (including the current collector) was 155 μm. The obtained foil was cut into a rectangular shape of 150 mm×30 mm to obtain a positive electrode.

[Production of Electrolytic Solution]

As an electrolytic solution, $LiPF_6$ was dissolved in a concentration of 1 mol/l in a mixed solvent of ethylene carbonate and diethyl carbonate at 3:7 by volume and the obtained solution was mixed with vinylene carbonate so as to adjust the concentration to be 5% by weight and obtain an electrolytic solution.

[Production of Battery]

Using the above-mentioned negative electrode, positive electrode, and a separator of a 27 μm-thick polyethylene porous body, a lithium secondary battery was produced. Sandwiching the separator between them, the positive electrode and the negative electrode were set face to face to obtain a laminate and the laminate was rolled in a spirally rolled state in such a manner that the negative electrode was in the inside to produce the electrode unit 5 shown in FIG. 3. As shown in FIG. 1, the positive electrode 2 and the negative electrode 3 were layered while sandwiching the separator 4 between them and they were rolled in such a manner that the negative electrode was set in the inside to obtain the electrode unit. The positive electrode 2 was composed by forming the positive-electrode mixture layers 2b and 2c in both faces of the positive-electrode current collector 2a. The negative electrode 3 was composed by forming the negative-electrode mixture layers 3b and 3c in both faces of the negative-electrode current collector 3a. As shown in FIG. 3, a positive electrode tab 7 was attached to the end part of the positive electrode and a negative electrode tab 8 was attached to the end part of the negative electrode.

Figure 4:
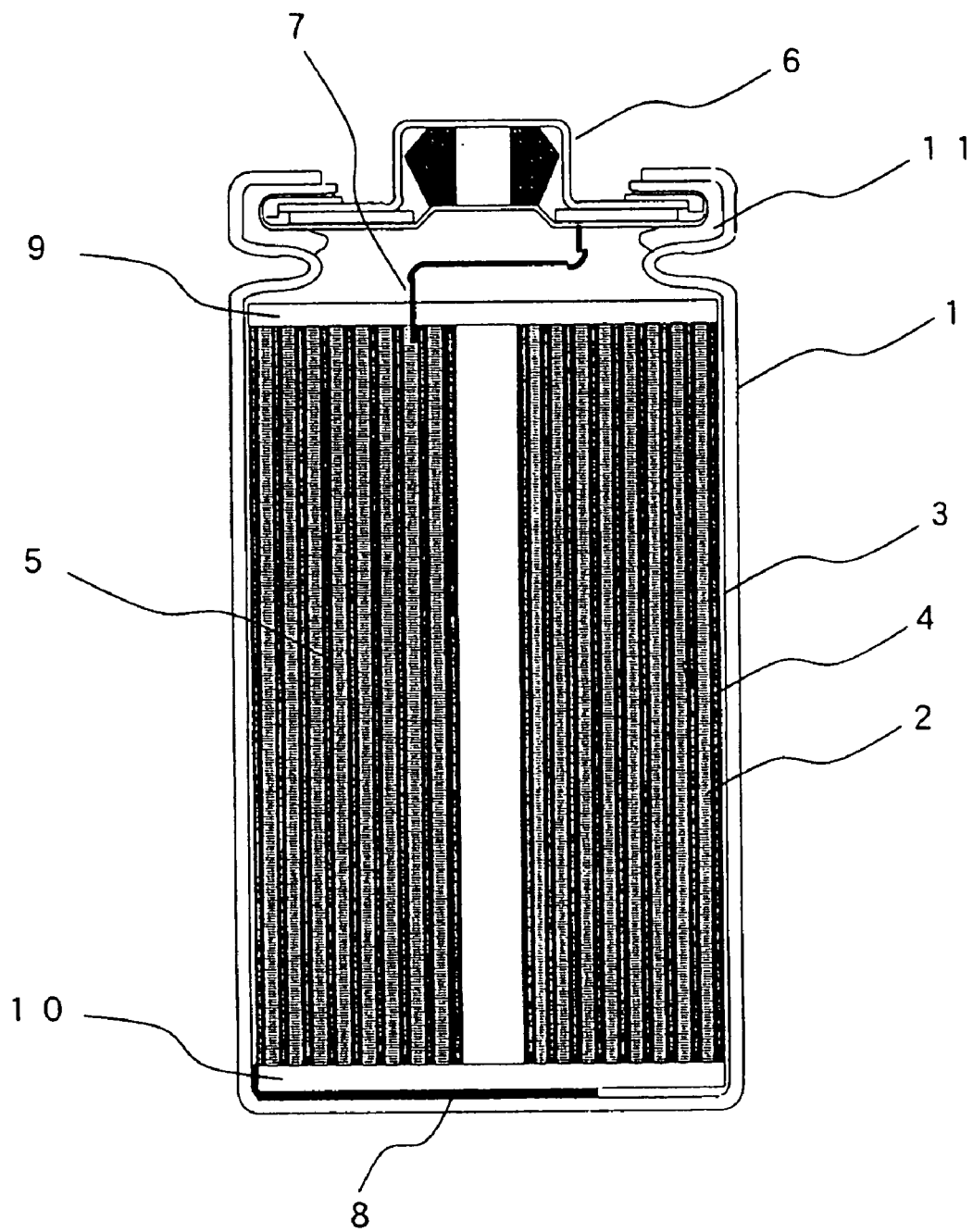
FIG. 4 is a cross-sectional view showing a lithium secondary battery of an example of the present invention.

The electrode unit 5 was housed in a cylindrical battery container to produce a cylindrical lithium secondary battery. FIG. 4 is a cross-sectional view of the cylindrical lithium secondary battery. The cylindrical lithium secondary battery comprises a battery outer casing 1 made of a metal and having an opening part in the top part, the electrode unit 5 obtained by rolling the positive electrode 2 and the negative electrode 3 sandwiching the separator 4 in the spirally rolled state, and a nonaqueous electrolytic solution with which the electrode unit 5 is impregnated, and a sealing cover 6 for sealing the opening part of the battery outer casing 1. The sealing cover 6 becomes a positive electrode terminal and the battery outer casing 1 becomes the negative electrode terminal and the positive electrode tab 7 attached to the top face side of the electrode unit 5 was connected to the sealing cover 6 and the negative electrode tub 8 attached to the lower face side was connected to the battery outer casing 1. The top face and the lower face of the electrode unit 5 were covered with an upper insulating plate 9 and a lower insulating plate 10 to insulate the electrode unit and the battery outer casing. The sealing cover 6 was fixed in the opening part of the battery outer casing 1 by being caulked through an insulation packing 11.

The electrode unit 5 shown in FIG. 3 and the above-mentioned electrolytic solution were inserted in the battery outer casing 1 in argon atmosphere at a normal temperature and a normal pressure in such a manner that the minimum curvature radius of the negative-electrode mixture layer which was set on the opposite to the positive-electrode mixture layer through the separator became 1.5 mm to obtain a cylindrical lithium secondary battery A1 having the structure as shown in FIG. 4.

EXPERIMENT 2

A battery A2 was produced in the same manner as the experiment 1, except that an electrode unit in which the curvature radius of the inner most circumference of the negative-electrode mixture layer facing to the positive-electrode mixture layer through the separator was adjusted to be 1.4 mm was used.

The ratio of the portion of the negative-electrode mixture layer having the curvature radius smaller than 1.5 mm was 0% for the battery A1 and 3% for the battery A2.

A battery A3 was produced in the same manner as the experiment 1, except that an electrode unit in which the curvature radius of the inner most circumference of the negative-electrode mixture layer facing to the positive-electrode mixture layer through the separator was adjusted to be 2 mm was used.

EXPERIMENT 3

Figure 5:
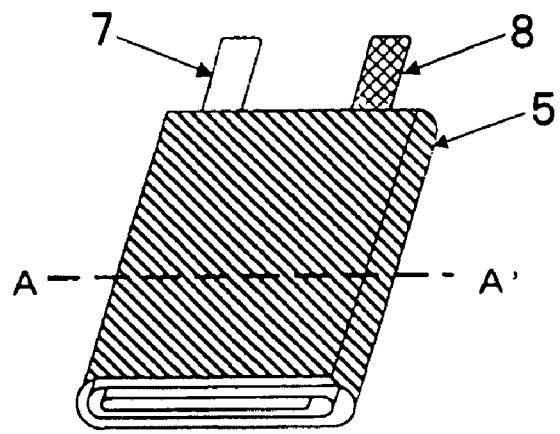
FIG. 5 is a perspective view showing an electrode unit of a comparative example.
Figure 6:
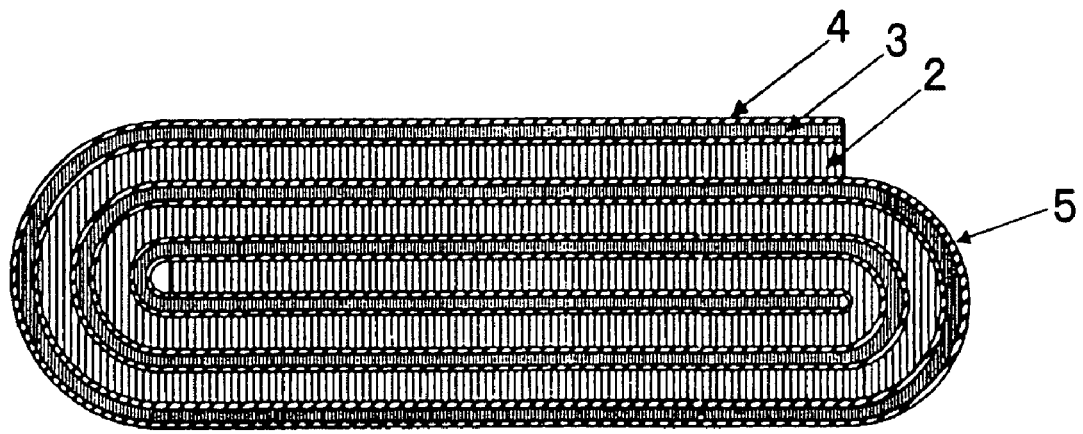
FIG. 6 is a cross-sectional view along the line A-A' shown in FIG. 5.

An electrode unit was produced as shown in FIG. 5 and FIG. 6 in the manner as experiment 1, in except that a positive electrode which was produced in a rectangular shape of 150× 30 mm was used and a negative electrode which was produced in a rectangular shape of 182×32 mm was used. FIG. 6 is a cross-sectional view along a line of A-A' shown in FIG. 5. As shown in FIG. 6, a laminate body 5 was produced in the manner that the positive electrode 2 and the negative electrode 3 sandwiching the separator 4 between them were layered and the separator 4 was placed further in the outside and the laminate body was rolled and made flat. As shown in FIG. 5, a positive electrode tab 7 was attached to the positive electrode 2 and a negative electrode tab 8 was attached to the negative electrode 3. The electrode unit 5 and the above-mentioned electrolytic solution were inserted into a bag-like outer casing made of an aluminum laminate in argon atmosphere at a normal temperature and a normal pressure to produce the lithium secondary battery B1.

EXPERIMENT 4

For comparison, the effects of the electrode structure on the charge-discharge cycle property of a battery using natural graphite for the negative-electrode active material were investigated.

[Production of Negative Electrode]

As an active material, 90 parts by weight of natural graphite powder with an average particle diameter of 18 μm was dissolved in 6% by weight of N-methyl-2-pyrrolidone solution containing 10 parts by weight of polyvinylidene fluoride (PVdF) as a binder to obtain a negative-electrode mixture slurry.

The above-mentioned negative-electrode mixture slurry was applied to both faces of a 35 μm-thick rolled Cu foil as a current collector and dried. The obtained foil with the resulting layer was cut in to rectangular shape of 180 mm×32 mm and rolled to obtain a negative electrode. The thickness of the negative electrode (including the current collector) was 161 μm.

[Production of Battery]

A lithium secondary battery C1 was produced in the same manner as the production of the battery A1 in the experiment 1, except that a negative electrode using the above-mentioned natural graphite was used.

A lithium secondary battery C2 was produced in the same manner as the production of the battery A2 in the experiment 2, except that a negative electrode using the above-mentioned natural graphite was used.

A lithium secondary battery C3 was produced in the same manner as the production of the battery A3 in the experiment 2, except that a negative electrode using the above-mentioned natural graphite was used.

A lithium secondary battery C4 was produced in the same manner as the production of the battery B1 in the experiment 3, except that a negative electrode using the above-mentioned natural graphite and having a rectangular shape of 182 mm×32 mm was used.

[Evaluation of the Charge-Discharge Cycle Property]

The charge-discharge cycle properties of the batteries A1 to A3, B1, and C1 to C4 were evaluated. The respective batteries were charged at 25° C. to 4.2 V and then discharged to 2.75V and this process was defined as one charge-discharge cycle. The number of the cycles at which the discharging capacity was decreased to 80% of that in the 1st cycle was measured and the measured value was defined as the cycle life. The measurement results of the batteries A1 to A3 and B1 are shown in Table 1 and measurement results of the batteries C1 to C4 are shown in Table 2.

The cycle lives of the batteries A1 to A3 and B1 are shown as relative indexes to 100 which is defined as the cycle life of the battery A1. The cycle lives of the batteries C1 to C4 are shown as relative indexes to 100 which is defined as the cycle life of the battery C1.

TABLE 1

| Battery | Negative-Electrode Active Material | Electrode Structure | Minimum Curvature Radius of Negative-Electrode Mixture Layer (mm) | Cycle life |
|---|---|---|---|---|
| A1 | Silicon | Spirally Rolled State | 1.5 | 100 |
| A2 | Silicon | Spirally Rolled State | 1.4 | 90 |
| A3 | Silicon | Spirally Rolled State | 2 | 105 |
| B1 | Silicon | Made Flat after Rolling | — | 48 |

TABLE 2

| Battery | Negative-Electrode Active Material | Electrode Structure | Minimum Curvature Radius of Negative-Electrode Mixture Layer (mm) | Cycle life |
|---|---|---|---|---|
| C1 | Natural Graphite | Spirally Rolled State | 1.5 | 100 |
| C2 | Natural Graphite | Spirally Rolled State | 1.4 | 99 |
| C3 | Natural Graphite | Spirally Rolled State | 2 | 101 |

TABLE 2-continued

| Battery | Negative-Electrode Active Material | Electrode Structure | Minimum Curvature Radius of Negative-Electrode Mixture Layer (mm) | Cycle life |
|---|---|---|---|---|
| C4 | Natural Graphite | Made Flat after Rolling | — | 99 |

Being made clear from Table 1, the batteries A1 to A3 comprising the electrode units obtained rolled in spirally rolled state and housed in cylindrical battery containers without made flat were found having longer cycle lives than that of the battery B1 whose electrode unit was made flat. That is supposedly attributed to that the electrode units of the batteries A1 to A3 had small curvature alteration of the electrodes as compared with the electrode unit of the battery B1 and therefore no uneven stain was caused in the electrodes and the stress generated by the significant volume change of the negative-electrode active material at the time of storing and releasing lithium could be moderated by the mixture layers and current collectors and accordingly the current collection capability in the electrodes was maintained even at the time of charging and discharging.

Also, being made clear from Table 1, the batteries A1 and A3 in which the minimum curvature radius in the negative-electrode mixture layers was adjusted to be 1.5 mm or more were found having longer cycle lives than that of the battery A2 in which the minimum curvature radius in the negative-electrode mixture layer was 1.4 mm. That is supposedly attributed to that it became more difficult to properly moderate the stress generated by the significant volume change of the negative-electrode active material at the time of storing and releasing lithium in the positive electrodes as the curvature radius was smaller and the strain of the electrodes were more significant and thus the current collection capability deterioration became significant owing to the breakage of the mixture layers.

In the case the negative-electrode mixture layer included a portion where the curvature radius was smaller than 1.5 mm, it is supposed that such a portion induced breakage of he negative-electrode mixture layer and thus the current collection capability in the electrodes was decreased.

Being made clear from Table 2, in the case natural graphite was used as the negative-electrode active material, the batteries C1 to C3 and the battery C4 showed approximately same charge-discharge cycle property. That is supposedly attributed to that in the case of negative electrodes using natural graphite as the negative-electrode active material, the volume alteration of the natural graphite particles was less significant than that of silicon particles at the time of adsorbing and releasing lithium and therefore, even in the portions with a smaller curvature radius in the negative-electrode mixture layers, no significant strain was caused and the current collection capability in the electrodes was maintained at the time of charging-discharging.

EXPERIMENT 5

Here, the effects of the curvature radius of a negative electrode on the charge-discharge cycle property will be discussed.

[Production of Negative Electrode]

A negative electrode was produced in the same manner as the experiment 1, except that the negative-electrode mixture layer was formed only on one face of the current collector and the current collector was made to be rectangular with a size of 9 mm×32 mm.

[Production of Positive Electrode]

A positive electrode was produced in the same manner as the experiment 1, except that the positive-electrode mixture layer was formed only on one face of the current collector and the current collector was made to be rectangular with a size of 8 mm×30 mm.

[Production of Battery]

Figure 2:
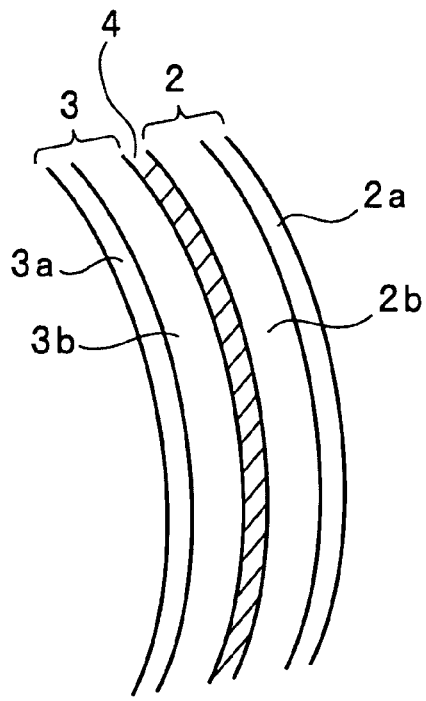
FIG. 2 is a cross-sectional view showing the layered state of a negative electrode, a separator, and a positive electrode of another example of the present invention.

A laminate was produced using the above-mentioned negative electrode and positive electrode and a separator of the same polyethylene porous body as that of experiment 1 by setting the positive-electrode mixture layer and the negative-electrode mixture layer face to face while inserting the separator between them and an electrode unit was produced by rolling the laminate in one turn around a rolling core with a diameter of 3.0 mm and made of SUS in such a manner that the negative-electrode current collector of the laminate was set in the inside. That is, as shown in FIG. 2, the negative-electrode mixture layer 3b and the positive-electrode mixture layer 2b were set face to face while sandwiching the separator 4 between them and the negative-electrode mixture layer 3b was positioned in the outer side in relation to the negative-electrode current collector 3a. The curvature radius of the negative-electrode mixture layer was 1.5425 mm.

The above-mentioned electrode unit and the electrolytic solution same as that in the experiment 1 were housed in a dipolar type glass cell in argon atmosphere at a normal temperature and a normal pressure to produce a lithium secondary battery A5. A positive electrode terminal and a negative electrode terminal were installed in the bipolar glass cell and these terminals were connected to a positive electrode tab and a negative electrode tab of the respective electrodes to make charging and discharging possible.

Batteries A6 and A7 were produced in the same manner as the production of the battery A5, except that the electrode units were produced by changing the diameter of the rolling cores to be 4 mm and 5 mm. The curvature radii of the negative-electrode mixture layers of the batteries A6 and A7 were 2.0425 mm and 2.5425 mm, respectively.

A battery A8 was produced in the same manner as the production of the battery A5, except that the electrode unit was produced by rolling the electrode laminate while setting the positive-electrode current collector in the inner side. The curvature radius of the negative-electrode mixture layer of the battery A8 was 1.6195 mm.

Batteries A9 and A10 were produced in the same manner as the production of the battery A8, except that the diameter of the rolling cores were changed to be 4 mm and 5 mm. The curvature radii of the negative-electrode mixture layers of the batteries A9 and A10 were 2.1195 mm and 2.6195 mm, respectively.

[Evaluation of the Charge-Discharge Cycle Property]

The charge-discharge cycle properties of the batteries A5 to A10 were evaluated. The respective batteries were charged at 25° C. to 4.2 V and then discharged to 2.75V and this process was defined as one charge-discharge cycle. The number of the cycles at which the discharging capacity was decreased to 80% of that in the 1st cycle was measured and the measured value was defined as the cycle life. The measurement results of the batteries A5 to A10 are shown in Table 3.

The cycle lives of the batteries A5 to A10 are shown as relative indexes to 100 which is defined as the cycle life of the battery A5.

TABLE 3

| Battery | Curvature Radius of Negative-Electrode Mixture Layer (mm) | Position of Negative-Electrode Mixture Layer | Cycle life |
|---|---|---|---|
| A5 | 1.5425 | Rolled in Outside | 100 |
| A6 | 2.0425 | Rolled in Outside | 105 |
| A7 | 2.5425 | Rolled in Outside | 109 |
| A8 | 1.6195 | Rolled in Inside | 82 |
| A9 | 2.1195 | Rolled in Inside | 85 |
| A10 | 2.6195 | Rolled in Inside | 87 |

Being made clear from Table 3, the batteries comprising the negative electrodes having the negative-electrode mixture layers with higher curvature radii were found having more excellent charge-discharge cycle property. That is supposedly attributed to that the negative-electrode mixture layers with larger curvature radii and the portions of the electrodes had smaller strains could more properly moderate the stress generated by the significant volume change of the negative-electrode active material at the time of storing and releasing lithium. Also, as compared with batteries A8 to A10 in which the negative-electrode mixture layers were positioned in the inner side in relation to the negative-electrode current collectors, the batteries A5 to A7 in which the negative-electrode mixture layers were positioned in the outer side in relation to the negative-electrode current collectors were found having more excellent charge-discharge cycle property. That is supposedly attributed to that since the negative-electrode mixture layers were placed in the inner side relatively to the negative-electrode current collectors in the batteries A8 to A10, strain existed in the direction of contraction of the negative-electrode mixture layers and when the volume of the mixture layers was expanded by the volume expansion of the active material at the time of storing lithium, the stress owing to the strain in the mixture layers was converged to result in easy breakage of the mixture layers and significant deterioration of the current collection capability in the electrodes.

EXPERIMENT 6

Noted the results of the experiment 5, the effects of the electrode structure of the negative electrode having the negative-electrode mixture layer, which was set on the opposite to the positive electrode through the separator, with a curvature radius 2.5 mm or smaller on the charge-discharge cycle property of the battery were discussed.
[Production of Negative Electrode]
A negative electrode was produced in the same manner as the experiment 1, except that the negative-electrode mixture layer was formed only in a rectangular portion with a size of 82 mm×32 mm on one face of the negative-electrode current collector.
[Production of Positive Electrode]
A positive electrode was produced in the same manner as the experiment 1, except that the positive-electrode mixture layer was formed only in a rectangular portion with a size of 69 mm×30 mm on one face of the positive-electrode current collector.
[Production of Battery]
A laminate was produced using the above-mentioned negative electrode and positive electrode and a 27 μm-thick separator of a polyethylene porous body in such a manner that one coated portions in one face sides of the positive electrode and the negative electrode were set face to face and an electrode unit was produced by rolling the laminate such a manner that the negative-electrode current collector of the laminate was set in the inside. The curvature radius of the negative-electrode mixture layer in the inner most circumference facing to the positive-electrode mixture layer through the separator was 1.5 mm, and the maximum curvature radius of the negative-electrode mixture layer was 2.5 mm in the coated portion in one face of the negative electrode.

A battery A11 was produced in the same manner as the experiment 1, except that the above-mentioned electrode unit was used for the electrode unit.

A battery A12 was produced in the same manner as the battery A11, except that the size of the coated portion in one face of the positive electrode was adjusted to be 36 mm×30 mm and the size of the coated portion in one face of the negative electrode was adjusted to be 50 mm×32 mm and the curvature radius of the negative-electrode mixture layer in the innermost circumference facing to the positive-electrode mixture layer through the separator was changed to be 2 mm. The maximum curvature radius in the portions in one face where the negative-electrode mixture layer was formed was 2.5 mm.
[Evaluation of the Charge-Discharge Cycle Property]
The charge-discharge cycle properties of the above-mentioned batteries A11 and A12 were evaluated. The respective batteries were charged at 25° C. to 4.2 V and then discharged to 2.75V and this process was defined as one charge-discharge cycle. The number of the cycles at which the discharging capacity was decreased to 80% of that in the 1st cycle was measured and the measured value was defined as the cycle life. The measurement results of the batteries A11 and A12 are shown in Table 4.

The cycle lives of the batteries A11 and A12 are shown as relative indexes to 100 which is defined as the cycle life of the battery A1. The cycle life of the battery A1 is also shown in Table 4.

TABLE 4

| Battery | Placement State of Negative-Electrode Mixture Layer in the Portion with Curvature Radius 2.5 mm or Smaller | Minimum Curvature Radius of the Negative-Electrode Mixture Layer (mm) | Cycle life |
|---|---|---|---|
| A11 | Placed on One Face of Current Collector | 1.5 | 112 |
| A12 | Placed on One Face of Current Collector | 2 | 120 |
| A1 | Placed on Both Faces of Current Collector | 1.5 | 100 |

Being made clear from Table 4, the charge-discharge cycle property was found further improved by forming the negative-electrode mixture layer only on one face of the negative-electrode current collector in the portion where the curvature radius of the negative-electrode mixture layer was 2.5 mm or smaller. Based on the comparison of the batteries A11 and A12, the charge-discharge cycle property was found further improved by increasing the curvature radius of the negative-electrode mixture layer in the innermost circumference.

EXPERIMENT 7

The effects of the average particle diameter of the negative-electrode active material on the charge-discharge cycle property were investigated here.

Batteries A13 and A14 were produced in the same manner as the experiment 1, except that silicon powders with average particle diameters of 8 μm or 29 μm were used as the negative-electrode active material.

The charge-discharge cycle properties of the above-mentioned batteries were evaluated in the same manner as the battery A1.

The cycle lives of the batteries are shown as relative indexes to 100 which is defined as the cycle life of the battery A1. The cycle life of the battery A1 is also shown in Table 5.

TABLE 5

| Battery | Average Particle Diameter of Silicon Powder (μm) | Cycle life |
|---|---|---|
| A1 | 3 | 100 |
| A13 | 8 | 83 |
| A14 | 29 | 63 |

Being made clear from Table 5, the charge-discharge cycle property was found further improved in the batteries using the negative-electrode active material with smaller average particle diameter. That is supposedly attributed to that the absolute degree of the expansion and contraction of the volume of the active material particles following the storage and release of lithium in the charging-discharging reaction could be suppressed by using the active material particles with a small average particle diameter and the absolute degree of the strain among the active material particles in the electrodes could also be suppressed at the time of charging-discharging reaction and accordingly no binder breakage was caused and the deterioration of current collection capability in the electrodes could be suppressed.

EXPERIMENT 8

The effects of the arithmetical mean roughness Ra of the negative-electrode current collector surface on the charge-discharge cycle property were investigated here.

Batteries A15 and A16 were produced in the same manner as the experiment 1, except that a Cu-0.03 wt. % Zr alloy foil surface-roughened by electrolytic copper plating or having the arithmetical mean roughness Ra 0.2 μm and a Cu-0.03 wt. % Zr alloy foil surface-roughened by electrolytic copper plating and having the arithmetical mean roughness Ra 0.17 μm were used, respectively, in place of the a Cu-0.03 wt. % Zr alloy foil surface-roughened by electrolytic copper plating and having the arithmetical mean roughness Ra 1.0 μm.

The charge-discharge cycle properties of the above-mentioned batteries were evaluated in the same manner as the battery A1.

The cycle lives of the batteries are shown as relative indexes to 100 which is defined as the cycle life of the battery A1. The cycle life of the battery A1 is also shown in Table 6.

TABLE 6

| Battery | Surface-Roughness of Negative-Electrode Current Collector (μm) | Cycle life |
|---|---|---|
| A1 | 1.0 | 100 |
| A15 | 0.2 | 74 |
| A16 | 0.17 | 55 |

Being made clear from Table 6, the charge-discharge cycle property was found further improved in the battery using the negative-electrode current collector having higher arithmetical mean roughness Ra. That is supposedly attributed to that the anchor effect by the binder between the current collector and the binder was made significant by using the metal foil current collector with higher surface roughness and the adhesion strength between the mixture layer and the current collector was significantly improved and thus the separation of the mixture layer from the current collector owing to the expansion and contraction of the active material particles following the storage and release of lithium was suppressed and the current collection capability in the electrodes was improved.

EXPERIMENT 9

The effects of a conductive powder added to the negative-electrode mixture layer on the charge-discharge cycle property were investigated here.

Batteries A17, A18, and A19 were produced in the same manner as the experiment 1, except that a Ni powder with an average particle diameter of 3 μm, a Co powder with an average particle diameter of 5 μm, and a Ti powder with an average particle diameter of 10 μm were added in the amount of 20% by weight of Si powder to the mixture layers of the respective negative electrodes.

The charge-discharge cycle properties of the above-mentioned batteries were evaluated in the same manner as the battery A1 and the results are shown in Table 7.

The cycle lives of the batteries are shown as relative indexes to 100 which is defined as the cycle life of the battery A1. The cycle life of the battery A1 is also shown in Table 7.

TABLE 7

| Battery | Added Conductive Powder | Cycle life |
|---|---|---|
| A1 | None | 100 |
| A17 | Ni | 103 |
| A18 | Co | 104 |
| A19 | Ti | 102 |

Being made clear from Table 7, the charge-discharge cycle property was found further improved in the batteries A17 to A19 having the mixture layers to which the conductive powders were added as compared with that of the battery A1 having the mixture layer containing no conductive powder. That is supposedly attributed to that conductive network was formed by the surrounding of the active material particles with the conductive powders and thus the current collection capability in the mixture layers was increased.

EXPERIMENT 10

The effects of the sintering conditions in the negative electrode production on the charge-discharge cycle property were investigated here.

A battery A20 was produced in the same manner as the experiment 1, except that the heating treatment for sintering of the negative electrode was carried out at 700° C. for 10 hours. Also, a battery B2 was produced in the same manner as the experiment 1, except that no heating treatment for the negative electrode was carried out.

The charge-discharge cycle properties of the above-mentioned batteries were evaluated in the same manner as the battery A1 and the results are shown in Table 8. The cycle lives of the batteries are shown as relative indexes to 100 which is defined as the cycle life of the battery A1. The cycle life of the battery A1 is also shown in Table 8.

TABLE 8

| Battery | Heating Conditions for the Negative Electrode | Cycle life |
|---|---|---|
| A1 | at 400° C. for 30 hours | 100 |
| A20 | at 700° C. for 10 hours | 58 |
| B2 | None | 11 |

Being made clear from Table 8, the charge-discharge cycle property was found improved in the battery A1 comprising the negative electrode for which the heating treatment was carried out as compared with that of the battery B1 comprising the negative electrode without heating treatment. That is supposedly attributed to that the adhesion strength in the mixture layer and between the mixture layer and the current collector was increased owing to the sintering effect and thus the current collection capability in the negative electrode was increased.

The charge-discharge cycle property was found considerably deteriorated in the battery A20 comprising the negative electrode for which the heating treatment was carried out at 700° C. for 10 hours as compared with that of the battery A1 comprising the negative electrode for which the heating treatment was carried out at 400° C. for 30 hours. That is supposedly attributed to that the binder was decomposed by the heating treatment at 700° C. and therefore the adhesion strength in the negative electrode owing to the binder was significantly decreased and accordingly the current collection capability in the negative electrode was deteriorated.

What is claimed is:

1. A lithium secondary battery comprising:
    a positive electrode formed by disposing a positive-electrode mixture layer containing a positive-electrode active material and a positive-electrode binder, on a surface of a positive-electrode current collector;
    a negative electrode formed by sintering a negative-electrode mixture layer containing a negative-electrode binder and a negative-electrode active material containing silicon and/or a silicon alloy, disposed on a surface of a negative-electrode current collector,
    a separator disposed between said positive electrode and said negative electrode; and
    a nonaqueous electrolyte;
    wherein an electrode unit obtained by setting said positive electrode and said negative electrode opposed to each other through said separator and rolling them around a rolling core in a spirally rolled state is placed in a cylindrical battery container and wherein a minimum curvature radius of said negative-electrode mixture layer opposed to said positive-electrode mixture layer through said separator in said spirally rolled state is 2.0 mm or larger,
    wherein, in the portion of said negative-electrode mixture layer having a curvature radius of 2.5 mm or smaller and opposing to said positive-electrode mixture layer through said separator, said negative-electrode mixture layer is provided on only one face of said negative-electrode current collector and is rolled so as to place said negative-electrode current collector in the inner side and said negative-electrode mixture layer in the outer side and said positive-electrode mixture layer is provided on only one face of said positive-electrode current collector and is rolled so as to lace said positive-electrode mixture layer in the inner side and said positive-electrode current collector in the outer side, and in the portion of said negative-electrode mixture layer having a curvature radius of greater than 2.5 mm and opposing to said positive-electrode mixture layer through said separator, said negative-electrode mixture layer is provided on both faces of said negative-electrode current collector, and
    wherein said minimum curvature radius of said negative-electrode mixture layer is determined by a diameter of said rolling coil.

2. The lithium secondary battery according to claim 1, wherein a surface of said negative-electrode current collector has an arithmetical mean roughness Ra of 0.2 μm or higher.

3. The lithium secondary battery according to claim 1, wherein said negative-electrode current collector is a copper foil, a copper alloy foil, or a metal foil bearing a copper layer or a copper alloy layer on its surface.

4. The lithium secondary battery according to claim 1, wherein said negative-electrode current collector is an electrolytic copper foil, an electrolytic copper alloy foil, or a metal foil bearing an electrolytic copper layer or an electrolytic copper alloy layer on its surface.

5. The lithium secondary battery according to claim 1, wherein said negative-electrode binder remains even after heat treatment for sintering.

6. The lithium secondary battery according to claim 1, wherein said negative-electrode binder comprises polyimide.

7. The lithium secondary battery according to claim 1, wherein the average particle diameter of said negative-electrode active material is 10 μm or smaller.

8. The lithium secondary battery according to claim 1, wherein said negative-electrode active material comprises silicon particles.

9. The lithium secondary battery according to claim 1, wherein said negative-electrode mixture layer comprises a conductive powder.

10. The lithium secondary battery according to claim 1, wherein sintering of said negative electrode is carried out in non-oxidizing atmosphere.

11. A method for manufacturing a lithium secondary battery comprising: a positive electrode formed by disposing a positive-electrode mixture layer containing a positive-electrode active material and a positive-electrode binder, on a surface of a positive-electrode current collector; a negative electrode formed by sintering a negative-electrode mixture layer containing a negative-electrode binder and a negative-electrode active material containing silicon and/or a silicon alloy, disposed on a surface of a negative-electrode current collector; a separator disposed between said positive electrode and said negative electrode; and a nonaqueous electrolyte; said method comprising the steps of:
    producing an electrode unit by setting said positive electrode and said negative electrode opposed to each other through said separator, and rolling said electrode unit around a rolling coil in a spirally rolled state in which a minimum curvature radius of said negative-electrode mixture layer opposed to said positive-electrode mixture layer through said separator is 2.0 mm or larger, and wherein in the portion of said negative-electrode mixture layer having a curvature radius of 2.5 mm or smaller and opposing to said positive-electrode mixture layer through the separator, said negative-electrode mixture layer is provided on only one face of said negative-electrode current collector and is rolled so as to place said negative-electrode current collector in the inner side and said negative-electrode mixture layer in the outer side and said positive-electrode mixture layer is provided on only one face of said positive-electrode current collector and is rolled so as to place said positive-electrode mixture layer in the inner side and said positive-electrode current collector in the outer side, and in the portion of said negative-electrode mixture layer having a. curvature radius of greater than 2.5 mm and opposing to said positive-electrode mixture layer through said separator, said negative-electrode mixture layer is provided on both faces of said negative-electrode current collector, and wherein said minimum curvature radius of said negative-electrode mixture layer is determined by a diameter of said rolling coil; and placing said electrode unit in a cylindrical battery container.

12. The method for manufacturing a lithium secondary battery according to claim 11, further comprising the step of producing said negative electrode by applying a slurry produced by evenly mixing and dispersing particles of said negative-electrode active material containing silicon and/or silicon alloy in a solution of said negative-electrode binder to a surface of said negative-electrode current collector to provide said negative-electrode mixture layer on the surface and sintering said negative-electrode mixture layer while placing the layer on said negative-electrode current collector.

13. The method for manufacturing a lithium secondary battery according to claim 11, wherein the sintering of said negative electrode is carried out in non-oxidizing atmosphere.

14. A lithium secondary battery comprising:

a positive electrode formed by disposing a positive-electrode mixture layer containing a positive-electrode active material and a positive-electrode binder, on a surface of a positive-electrode current collector;

a negative electrode formed by sintering a negative-electrode mixture layer containing a negative-electrode binder and a negative-electrode active material containing silicon and/or a silicon alloy, disposed on a surface of a negative-electrode current collector;

a separator disposed between said positive electrode and said negative electrode; and a nonaqueous electrolyte;

wherein an electrode unit obtained by setting said positive electrode and said negative electrode opposed to each other through said separator and rolling them around a rolling core in a spirally rolled state is placed in a cylindrical battery container and wherein a curvature radius of an innermost circumferential part of said negative-electrode mixture layer opposed to said positive-electrode mixture layer through said separator in said spirally rolled state is 2.0 mm or larger, wherein, in the portion of said negative-electrode mixture layer having a curvature radius of 2.5 mm or smaller and opposing to said positive-electrode mixture layer through said separator, said negative-electrode mixture layer is provided on only one face of said negative-electrode current collector and is rolled so as to place said negative-electrode current collector in the inner side and said negative-electrode mixture layer in the outer side and said positive-electrode mixture layer is provided on only one face of said positive-electrode current collector and is rolled so as to lace said positive-electrode mixture layer in the inner side and said positive-electrode current collector in the outer side, and in the portion of said negative-electrode mixture layer having a curvature radius of greater than 2.5 mm and opposing to said positive-electrode mixture layer through said separator, said negative-electrode mixture layer is provided on both faces of said negative-electrode current collector, and wherein said curvature radius of an innermost circumferential part of said negative-electrode mixture layer is determined by a diameter of said rolling coil.

* * * * *